(12) United States Patent
Mullis et al.

(10) Patent No.: US 11,677,663 B2
(45) Date of Patent: Jun. 13, 2023

(54) SOFTWARE-DEFINED NETWORK STATISTICS EXTENSION

(71) Applicant: Schweitzer Engineering Laboratories, Inc., Pullman, WA (US)

(72) Inventors: Tristan Lloyd Mullis, Pullman, WA (US); Josh Powers, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/400,325

(22) Filed: Aug. 12, 2021

(65) Prior Publication Data

US 2023/0053223 A1    Feb. 16, 2023

(51) Int. Cl.
*H04L 45/64* (2022.01)
*H04L 45/7453* (2022.01)
*H04L 45/00* (2022.01)

(52) U.S. Cl.
CPC .............. *H04L 45/64* (2013.01); *H04L 45/38* (2013.01); *H04L 45/7453* (2013.01)

(58) Field of Classification Search
CPC ...... H04L 45/64; H04L 45/38; H04L 45/7453
See application file for complete search history.

(56) References Cited

U.S. PATENT DOCUMENTS

| | | | |
|---|---|---|---|
| 5,623,601 A | 4/1997 | Vu | |
| 5,680,324 A | 10/1997 | Schweitzer | |
| 5,793,750 A | 8/1998 | Schweitzer, III | |
| 5,826,014 A | 10/1998 | Coley | |
| 5,898,830 A | 4/1999 | Wesinger | |
| 6,151,300 A | 11/2000 | Hunt | |
| 6,256,592 B1 | 7/2001 | Roberts | |
| 6,539,341 B1 | 3/2003 | Li | |

(Continued)

FOREIGN PATENT DOCUMENTS

| CN | 203376828 | 1/2014 |
|---|---|---|
| CN | 106301952 | 1/2017 |

(Continued)

OTHER PUBLICATIONS

Ferrus, et al., "SDN/NFV-enabled satellite communications networks: Opportunities, scenarios and challenges." In: Physical Communication. Mar. 2016.

(Continued)

*Primary Examiner* — Donald L Mills
(74) *Attorney, Agent, or Firm* — Stoel Rives LLP; Richard M. Edge

(57) ABSTRACT

A software-defined network (SDN) rule modification counter system provides counters that track all changes and edits to rules at SDN controllers and SDN switches on an SDN. The system compares counters at the SDN controller and SDN switch to determine if they match. If the counters do not match, a change has been made to the rules. With the addition of rule edit statistics the SDN controller will now have visibility that a rule modification was performed. The SDN controller then verifies that the state of the device is the same as its expected state as a secondary integrity check. Based on the rule modification notification, changes to a central rules table at the SDN controller and changes to rule settings at the SDN switch are made according to preprogrammed logic.

19 Claims, 3 Drawing Sheets

(56) References Cited

U.S. PATENT DOCUMENTS

| | | |
|---|---|---|
| 6,603,748 B1 | 8/2003 | Lu |
| 6,751,562 B1 | 6/2004 | Blackett |
| 6,842,445 B2 | 1/2005 | Ahmavaara |
| 6,947,269 B2 | 9/2005 | Lee |
| 7,010,589 B2 | 3/2006 | Ewing |
| 7,027,896 B2 | 4/2006 | Thompson |
| 7,552,367 B2 | 6/2009 | Kasztenny |
| 7,710,999 B2 | 5/2010 | Bolder |
| 8,824,274 B1 | 9/2014 | Medved |
| 9,047,143 B2 | 6/2015 | Pruss et al. |
| 9,124,485 B2 | 9/2015 | Heron et al. |
| 9,137,140 B2 | 9/2015 | Tao et al. |
| 9,178,807 B1 | 11/2015 | Chua et al. |
| 9,258,212 B2 | 2/2016 | Pfeifer et al. |
| 9,258,315 B2 | 2/2016 | Martin |
| 9,270,754 B2 | 2/2016 | Iyengar et al. |
| 9,276,827 B2 | 3/2016 | Voit et al. |
| 9,282,164 B2 | 3/2016 | Finn et al. |
| 9,330,156 B2 | 5/2016 | Satapathy |
| 9,356,871 B2 | 5/2016 | Medved et al. |
| 9,392,050 B2 | 7/2016 | Voit et al. |
| 9,467,536 B1 | 10/2016 | Kanekar et al. |
| 9,503,363 B2 | 11/2016 | Sivabalan et al. |
| 9,596,141 B2 | 3/2017 | McDowall |
| 10,560,390 B2 | 2/2020 | Gammel |
| 10,652,084 B2 | 5/2020 | Witko |
| 10,756,956 B2 | 8/2020 | Gammel |
| 10,812,392 B2 | 10/2020 | Gammel |
| 11,425,033 B2 | 8/2022 | Kalra |
| 2002/0144156 A1 | 10/2002 | Copeland |
| 2004/0076273 A1 | 4/2004 | Oman |
| 2004/0208538 A1 | 10/2004 | Liwak |
| 2005/0138432 A1 | 6/2005 | Ransom |
| 2005/0280965 A1 | 12/2005 | Lee |
| 2006/0126596 A1 | 6/2006 | Shieh |
| 2006/0146996 A1 | 7/2006 | Oman |
| 2007/0025036 A1 | 2/2007 | Morris |
| 2007/0089029 A1 | 4/2007 | Ginzburg |
| 2007/0112446 A1 | 5/2007 | Deveaux |
| 2007/0147415 A1 | 6/2007 | Marusca |
| 2007/0217343 A1 | 9/2007 | Znamova |
| 2007/0280239 A1 | 12/2007 | Lund |
| 2008/0075019 A1 | 3/2008 | Petras |
| 2008/0089277 A1 | 4/2008 | Alexander |
| 2008/0091770 A1 | 4/2008 | Petras |
| 2008/0095059 A1 | 4/2008 | Chu |
| 2008/0097694 A1 | 4/2008 | Petras |
| 2009/0296583 A1 | 12/2009 | Dolezilek |
| 2010/0097945 A1 | 4/2010 | Raftelis |
| 2010/0324845 A1 | 12/2010 | Spanier |
| 2012/0300615 A1 | 11/2012 | Kempf |
| 2012/0300859 A1 | 11/2012 | Chapman |
| 2012/0331534 A1 | 12/2012 | Smith |
| 2013/0036102 A1* | 2/2013 | Goyal ............... G06F 12/0802 707/694 |
| 2013/0121400 A1 | 5/2013 | Eliezer |
| 2013/0142205 A1* | 6/2013 | Munoz ............... G06F 9/3885 370/419 |
| 2013/0163475 A1 | 6/2013 | Beliveau |
| 2013/0311675 A1 | 11/2013 | Kancherla |
| 2014/0003422 A1 | 1/2014 | Mogul |
| 2014/0095685 A1 | 4/2014 | Cvijetic et al. |
| 2014/0109182 A1 | 4/2014 | Smith et al. |
| 2014/0280893 A1 | 9/2014 | Pfeifer et al. |
| 2014/0317248 A1 | 10/2014 | Holness et al. |
| 2014/0317256 A1 | 10/2014 | Jiang et al. |
| 2014/0317293 A1 | 10/2014 | Shatzkamer |
| 2014/0330944 A1 | 11/2014 | Dabbiere et al. |
| 2014/0365634 A1 | 12/2014 | Metz et al. |
| 2015/0130935 A1 | 5/2015 | Siann et al. |
| 2015/0281036 A1 | 10/2015 | Sun et al. |
| 2016/0014819 A1 | 1/2016 | Cona |
| 2016/0065452 A1* | 3/2016 | Kruglick ............ H04L 43/0876 709/221 |
| 2016/0112269 A1 | 4/2016 | Singh et al. |
| 2016/0139939 A1 | 5/2016 | Bosch et al. |
| 2016/0142427 A1 | 5/2016 | De Los Reyes et al. |
| 2016/0234234 A1 | 8/2016 | McGrew et al. |
| 2017/0019417 A1 | 1/2017 | McGrew et al. |
| 2017/0026349 A1 | 1/2017 | Smith et al. |
| 2017/0054626 A1 | 2/2017 | Sivabalan et al. |
| 2017/0070416 A1 | 3/2017 | Narayanan et al. |
| 2017/0142034 A1 | 5/2017 | K |
| 2017/0288947 A1 | 10/2017 | Kaniampady |
| 2017/0288950 A1 | 10/2017 | Manson et al. |
| 2018/0167337 A1* | 6/2018 | Keaveny ................ H04L 43/16 |
| 2018/0176090 A1 | 6/2018 | Lessmann |
| 2018/0241621 A1 | 8/2018 | Vaishnavi |
| 2018/0287725 A1 | 10/2018 | Rabinovich |
| 2018/0287859 A1 | 10/2018 | Desigowda |
| 2019/0007862 A1 | 1/2019 | Ha |
| 2019/0273686 A1 | 9/2019 | Gammel et al. |
| 2020/0059495 A1* | 2/2020 | Karame ............ H04L 41/0893 |
| 2021/0306255 A1 | 9/2021 | Kalra |

FOREIGN PATENT DOCUMENTS

| | | |
|---|---|---|
| EP | 3109128 | 12/2016 |
| WO | 2005086418 | 9/2005 |
| WO | 2016206741 | 12/2016 |
| WO | 2017067578 | 4/2017 |

OTHER PUBLICATIONS

Mizrahi et al., Time-based Updates in OpenFlow: A Proposed Extension to the OpenFlow Protocol, Jul. 7, 2013, CCIT Report #835, Jul. 2013, EE Pub No. 1792, Technion, Israel (Year: 2013).

Gember et al., "Toward Software-Defined Middlebox Networking" In: Proceedings of the 11th ACM Workshop on Hot Topics in Networks. Oct. 30, 2012.

Molina et al., "Performance Enhancement of High-Availability Seamless Redundancy (HSR) Networks Using OpenFlow" IEEE, Nov. 30, 2015.

Herbert Faulk, MMS Ether-Real Network Analyzer, The Skunk Works.

Giovanni Vigna, Andrew Mitchell, "Mnemosyne: Designing and Implementing Network Short-Term Memory", Reliable Software Group, University of California, Santa Barbara, Proceedings of the Eighth IEEE International Conference on Engineering of Complex Computeer Systems (ICECCS '02) 1050-4729/02, 2002.

Richard Sharpe, Ed Warnicke, ULF Lamping, Ethereal User's Guide, V2.0.2 (15685) for Ethereal 0.10.12, 2005.

\* cited by examiner

SOFTWARE-DEFINED NETWORK STATISTICS EXTENSION

TECHNICAL FIELD

This disclosure relates to systems and methods of controlling and/or monitoring a network.

DETAILED DESCRIPTION OF PREFERRED EMBODIMENTS

Figure 1:
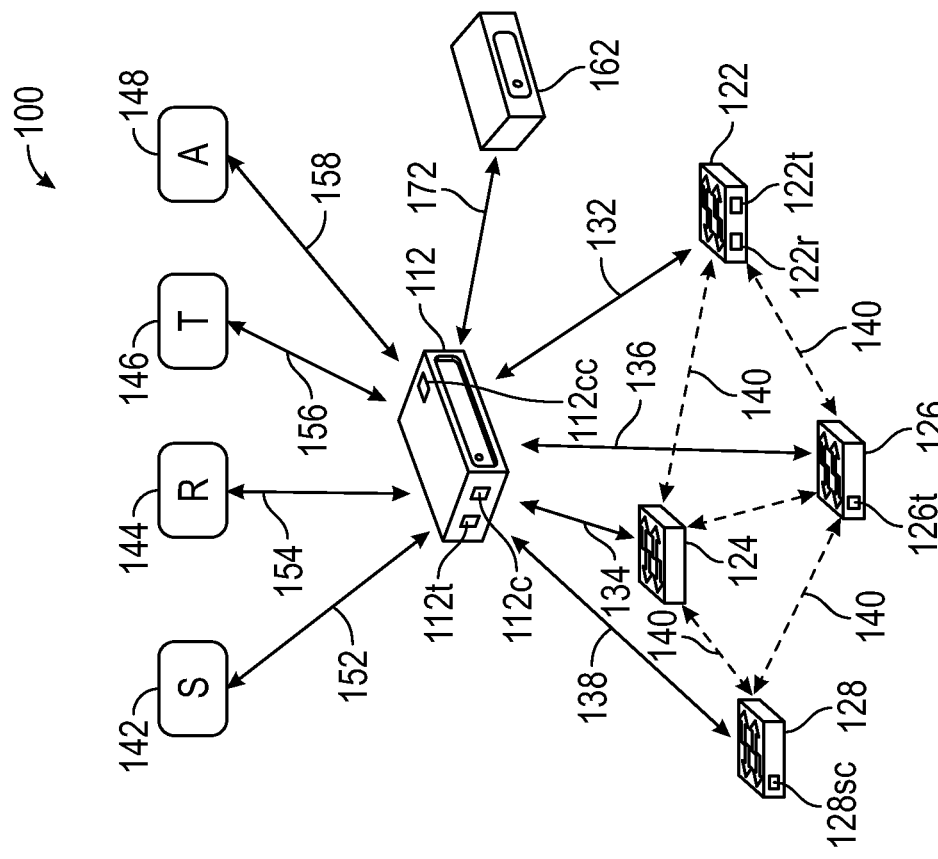
FIG. 1 is an illustration of a software-defined network (SDN), according to one embodiment of the present disclosure.

Currently, any software-defined network (SDN) controller that is monitoring SDN devices for unexpected rule changes must download these devices' entire rule sets and compare them against the expected rule sets on the SDN controller. This quickly becomes impractical when each SDN device has thousands of rules and there are hundreds of SDN devices in the network. Current SDN implementations provide statistics counts for how many rules are configured on an SDN device, but this is insufficient as this is only an indicator of rules being added or deleted. A rule can also be modified in place to perform a different function without changing the rule count or otherwise notifying the controller. Thus, more information is required to know when rules change on an SDN device.

With traditional Information Technology (IT) SDNs, the rules are changing constantly and knowing the rule edits are being made is less useful. In Operational Technology (OT) networks for critical infrastructure, however, changes are rare and knowing rule edits were made is a direct indicator of unexpected changes.

Communication equipment coupled to and/or integrated with operation devices, such a power system devices, may be configured to form one or more communication networks that can be utilized to facilitate an exchange of data among a variety of power system devices that monitor conditions and/or control actions on the power system to maintain the stability of the power system. The communication network(s) can send messages that carry information for a proper assessment of power system conditions and for implementing control actions based on such conditions. The potential for rapid changes in conditions of a power system results in constraints on the messages sent by a communication network (e.g., time constraints).

In some embodiments, the communication network(s) may include SDN technologies that may include an SDN controller that regulates communications on the network. SDN technologies offer a variety of features that can be advantageous for use with power systems (e.g., deny-by-default security, latency guarantees, deterministic transport capabilities, network agility, redundancy and fail over planning, etc.).

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. In addition, the terms "comprising" and "including" are open ended and even may allow for the inclusion of elements similar to recited elements but having different characteristics and/or configurations.

The embodiments of an SDN rule modification counter system disclosed herein can solve monitoring SDN rules for correctness without having to repeatedly download them all from SDN devices to check the correctness.

FIG. 1 is an illustration of a system 100, according to one embodiment of the present disclosure. In this embodiment, the system 100 is a communication network 100, and more specifically a software-defined network (SDN) 100, and is shown with multiple SDN devices. The system 100 includes: an SDN controller 112 with a central rules table 112*t*, an SDN switch 122 with rule settings 122*t*, and additional SDN switches 124, 126, and 128. SDN switch 126 also is shown as having rule settings 126*t*. The additional SDN switches 124, 128 likewise have rule settings (not shown). The system 100 also includes a rule counter 122*r* at SDN switch 122 that counts a number of rule modifications at the SDN switch and an operation counter 112*c* at the SDN controller 112 that corresponds to rule counter 122*r*. The SDN controller 112 receives from the SDN switch 122 an indication of the number of rule modifications at the SDN switch 122 counted on the rule counter 122*r* and compares the number of rule modifications at the rule counter 122*r* to a number of rule modifications at the operation counter 112*c*. The SDN controller 112 then updates the central rules table 112*t* and rule settings 126*t* based on pre-programmed rule logic for the compared rule modification counts that do not match. Communications from SDN switches 122, 124, 126, and 128 on a data plane 120 to the SDN controller 112 on a control plane 110 are transmitted via data paths 132, 134, 136, and 138. These data paths 132, 134, 136, 138 may be wired or wireless. Applications for security 142, routing 144, traffic engineering 146, and other general apps 148 on the application plane 104 communicate via data paths 152, 154, 156, and 158 as shown.

Modifications to the rule settings 122*t* at the SDN switch 122 are made based on the updated central rules. The modifications to the rule settings 122*t* at the SDN switch 122 can be communicated 140 to the one or more additional SDN switches 124, 126, and 128 on the network 100. In another embodiment, modifications to the rule settings 122*t* at the SDN switch 122 are communicated 172 to one or more additional SDN controllers 162 on the network 100. In other embodiments, SDN controller 112 alternatively or additionally determines hashes representing the current state of rule settings 122t at the SDN switch 122 and compares the hashes to corresponding hashes at the central rules table 112t. The controller or switch identifies hashes that do not match and makes updates to the central rules table 112t and the rule settings 122t of the SDN switch 122 based on pre-programmed logic for the hashes that do not match.

In some embodiments, the system 100 further comprises at least one controller counter 112cc at the SDN controller 112 and at least one switch counter 128sc at the SDN switch 128 that count modifications specified by the SDN controller 112. The SDN controller 112 then identifies counts from the controller counter 112cc and switch counter 128sc that do not match and updates the central rules table 112t and the rule settings 122t based on pre-programmed count logic for the counts that do not match.

Figure 2:
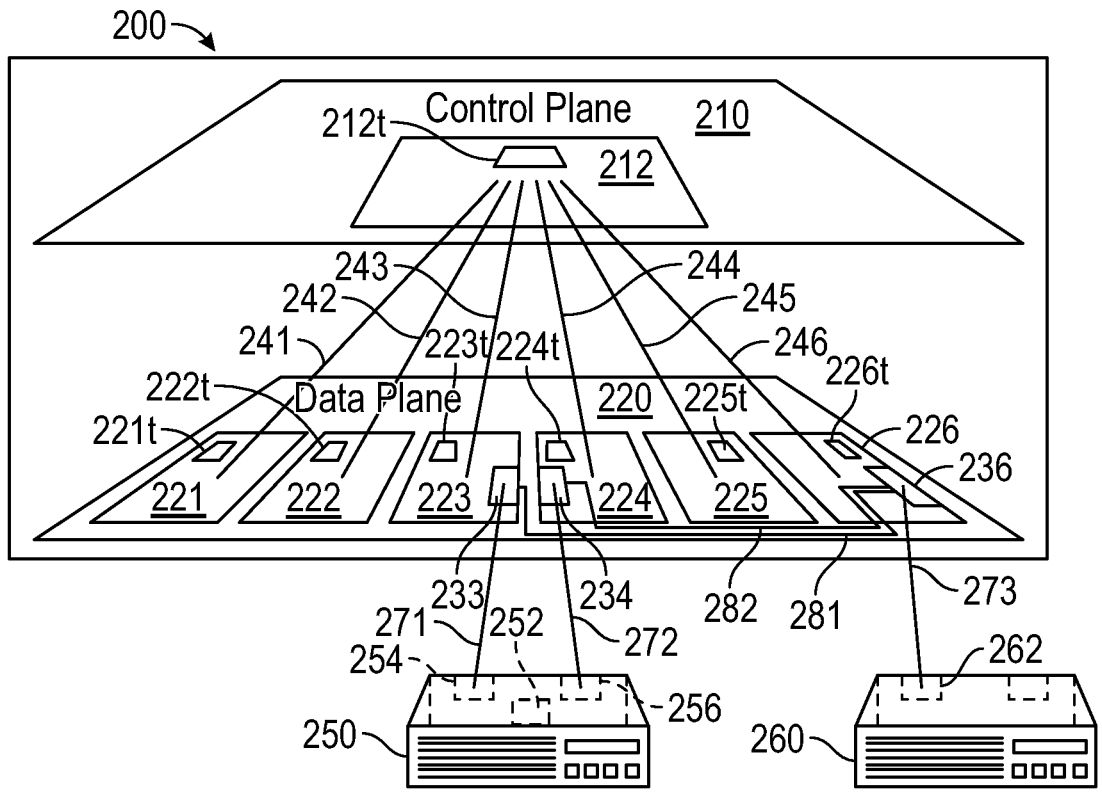
FIG. 2 is a diagram of a portion of a communication network, according to one embodiment of the present disclosure.

FIG. 2 is a diagram of a portion of a communication network 200 (also referred to herein simply as the "network" 200), according to one embodiment of the present disclosure. The network 200 may be an SDN. The network 200 may in some ways be analogous to the communication network 100 of FIG. 1. The portion of the network 200 illustrated is an SDN. The network 200 comprises a control plane 210 and a data plane 220 (e.g., respectively analogous to the control plane 110 and data plane 120 of FIG. 1). The control plane 210 comprises an SDN controller 212 that is in electronic communication with a plurality of SDN switches 221-226 via connections 241, 242, 243, 244, 245, 246. The SDN controller 212 further comprises a central rules table 212t (e.g., a database) comprising rules (e.g., message (or traffic) handling instructions) for each device associated with the network 200. The data plane 220 comprises a plurality of SDN switches, which may number in the thousands. The illustrated SDN switches 221-226 may be members of the plurality of SDN switches of the data plane 220. In FIG. 2, the plurality of SDN switches may include a first SDN switch 221, a second SDN switch 222, a third SDN switch 223, a fourth SDN switch 224, a fifth SDN switch 225, and a sixth SDN switch 226.

Each SDN switch 221-226 comprises a local rules table 221t-226t (e.g., a database) comprising message (or traffic) handling rules for messages to devices known to the particular SDN switch 221-226. The local rules table 221t-226t for each respective SDN switch 221-226 may be populated with rules held at the central rules table 212t. Each particular rule may be associated with message traffic of each particular communication port of each particular SDN switch 221-226. In other words, a local rules table 223t of the third SDN switch 223 may be populated by the SDN controller 212 with rules from the central rules table 212t for messages particularly associated to each communication port of the third SDN switch 223. The same method of local rules table population is true for each local rules table at each SDN switch 221-226 such that each local rules table comprises rules for messages received at ports of the particular SDN switch 221-226, and each local rules table may be devoid of rules associated to messages received at the other SDN switches 221-226.

A first network device 250 and a second network device 260 are shown in FIG. 2. Some network devices have one communication port connected to the network 200, and some network devices have a plurality of communication ports connected to the network 200. The first network device 250 is connected to the network 200 via two communication ports 254 and 256 using, respectively, connections 271 and 272. The second network device 260 is connected to the network via a communications port 262 using a connection 273. In the example of FIG. 2, the first network device 250 may be generating data (such as, e.g., monitor data, control data, control-response data, etc.) intended for delivery to at least the second network device 260.

By way of example and not limitation, a first network route 281 illustrates that traffic (messages) arriving from the first network device 250 at a communication port 233 is directed to a communication port 236 of the last SDN switch 266 for delivery to the second network device 260. A second network route 282 illustrates an alternative path whereby traffic from the first network device 250 arriving at a communication port 234 may be routed to the communication port 236 of the last SDN switch 226 for delivery to the second network device 260. The illustrated network routes 281, 282 are representative of any appropriate combination of physical and/or logical connections, pathways, and devices within the network 200. Furthermore, although the network routes 281, 282 are illustrated as wholly distinct from each other, in one embodiment, one or more portions of the first network route 281 may be coexistent with one or more portions of the second network route 282. Each network device connected to the network 200 comprises a media access controller (MAC). Each MAC has a theoretically unique MAC address. The first network device 250 comprises a MAC 252.

The data plane 220 may comprise dozens, hundreds, or even thousands of SDN switches, including at least the SDN switches 221-226. Each SDN switch may be configured to communicate with one or more network devices, and the number of network devices communicating with any given SDN switch may be in the thousands. Thus, the traffic level for the network 200 may be vast. One method of reducing the volume of traffic on the network to avoid network congestion and ensure both speed and agility is to limit the size of each message. For example, each message may comprise a header and payload. The header may comprise as little as only a MAC address for the originating network device. The payload may be limited to containing only formatted data without intervening identifiers (data-only payload).

Figure 3:
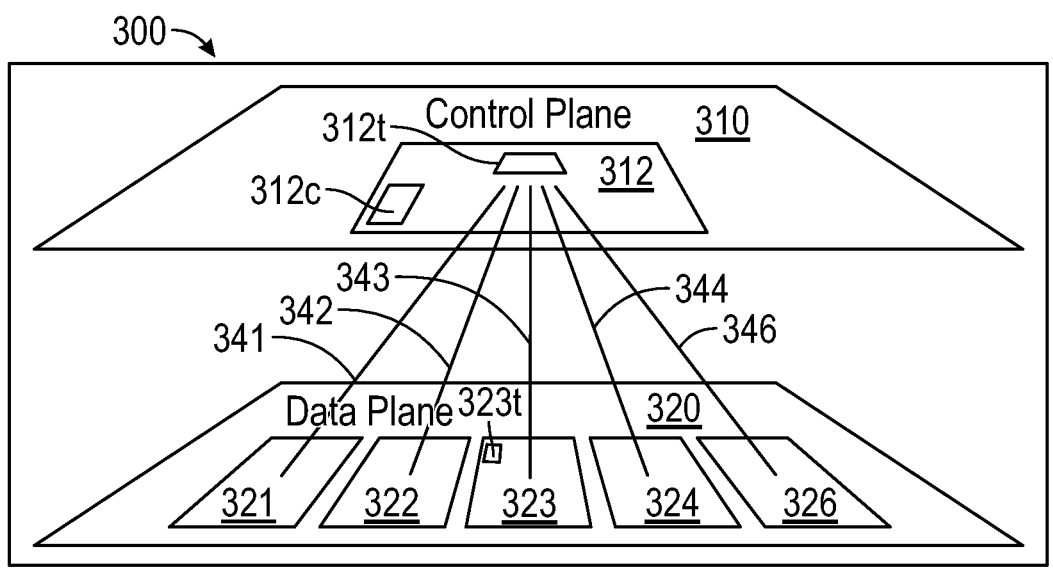
FIG. 3 is a diagram of another embodiment of a portion of a communication network, according to one embodiment of the present disclosure.

FIG. 3 is a diagram of another embodiment of a portion of a communication network 300, according to one embodiment of the present disclosure. A communication network 300 is shown with multiple SDN devices. Communication between the control plane 310 and data plane 320 are transmitted via data paths 341, 342, 343, 344, and 346 to the respective SDN switches 321-326 as shown. In this embodiment, SDN controller 312 includes a central rules table 312t and an operation counter 312c that counts a number of rule modifications at SDN switch 321. The operation counter 312c includes a table containing separate individual counts for rule modifications at each of the SDN switches 321-326. The operation counter 312c corresponds to rule counters at each of the SDN switches 321-326. The SDN controller 312 receives from each of the rule counters at SDN switches 321-326 an indication of a number of rule modifications at each of the SDN switches 321-326 counted on their respective rule counters and compares the number of rule modifications at the corresponding rule counter to the corresponding counts in the table of the operation counter 312c. The SDN controller 312 updates the central rules table 312t, along with the rule settings 323t at each SDN switch based on pre-programmed rule logic for the compared rule modification counts that do not match.

In other embodiments, modifications to the rule settings of the SDN switch are made based on the updated central rules. Modifications to the rule settings of the SDN switch are communicated to one or more additional SDN switches on a network. Modifications to the rule settings of the SDN switch are communicated to one or more additional SDN switches and SDN controllers on a network. In a certain embodiment, the SDN controller 312 may receive hashes representing the current state of rule settings from the SDN switch and compare the hashes to corresponding hashes at the central rules table. The SDN controller 312 may then identify hashes that do not match and make updates to the central rules table and the rule settings of the SDN switch based on pre-programmed logic for the hashes that do not match.

Figure 4:
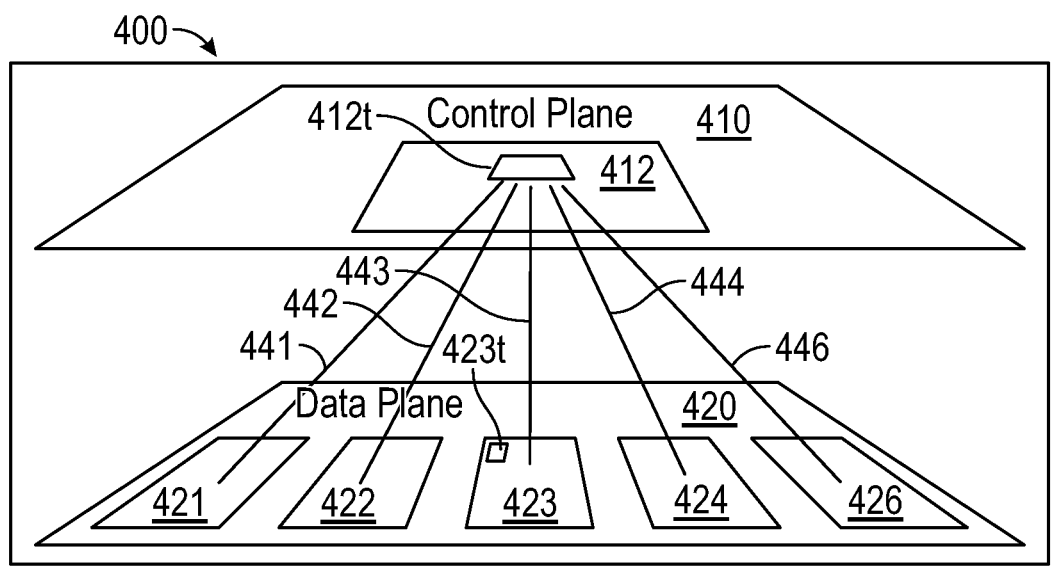
FIG. 4 is a diagram of a portion of a communication network according to an embodiment, according to one embodiment of the present disclosure.

FIG. 4 is a diagram of a portion of a communication network 400, according to another embodiment. In this embodiment, the communication network 400 is shown with multiple SDN devices. A packet processing device 421 to be included in an SDN includes a network interface (e.g., a port) to receive, via the SDN, control commands from an SDN controller 412 with a central rules table 412t along with a rule counter that counts a number of rule modifications at the packet processing device 421. The packet processing device 421 communicates the number of rule modifications at the packet processing device 421 to the SDN controller 412 and compares the number of rule modifications at the rule counter to a number of rule modifications at an operation counter at the SDN controller 412. The packet processing device 421 receives updates to the rule settings from the SDN controller 412 based on pre-programmed rule logic for the compared rule modification counts that do not match. Communication between a control plane 410 and data plane 420 are transmitted via data paths 441, 442, 443, and 446 to the respective packet processing devices 421, 422, 423, 424, and 426 as shown. The updates to the rule settings 423t at the packet processing devices are made based on the updated central rules. The modifications to the rule settings are communicated to one or more additional packet processing devices on the SDN.

In certain embodiments, the packet processing device 421 determines hashes representing the current state of rule settings at the packet processing device 421 and compares the hashes to corresponding hashes at a central rules table of the SDN controller. The packet processing device 421 then identifies hashes that do not match and makes updates to the rule settings of the packet processing device 421 based on pre-programmed logic for the hashes that do not match. In an embodiment, packet processing device 421 includes a switch counter that counts modifications specified by the SDN controller and communicates the count of the switch counter to the SDN controller to identify counts from the controller counter and switch counter that do not match. The packet processing device 421 notifies the SDN controller of the mismatch and the SDN controller updates the central rules table and the rule settings based on pre-programmed count logic for the counts that do not match. In an embodiment a packet processing device is an SDN switch.

In other embodiments, a method for modifying a processing rule within a system of SDN devices includes: counting a number of rule modifications by a rule counter in at least one SDN switch, counting a number of rule modifications by an operation counter in at least one SDN controller with a central rules table, receiving from the SDN switch an indication of the number of rule modifications at the SDN switch counted on the rule counter, comparing the number of rule modifications at the rule counter to a number of rule modifications at the operation counter, and updating the central rules table and rule settings based on pre-programmed rule logic for the compared rule modification counts that do not match. The method may also include determining hashes representing the current state of rule settings at the SDN switch and the central rules table at the SDN controller and updating the central rules table based on pre-programmed logic for the hashes that do not match. The method may include modifying the rule settings at the SDN switch based on the updated central rules table and communicating the modified rule settings at the SDN switch to one or more additional SDN switches on the network. The method may also include counting a number of modifications to the rule settings at each of the SDN switches on the network and updating the central rules table based on pre-programmed rule logic for the number of modifications that do not match.

In an embodiment, a system of SDN devices may include at least one SDN controller with a central rules table, at least one SDN switch with rule settings, a first counter at the SDN switch that counts data flow definitions that have changed at the SDN switch, and a second counter at the SDN controller that counts the data flow definition changes sent to the SDN switch. The SDN controller then compares the counts of the first counter to the counts at the second counter to determine if the counts match. The system identifies the counts that do not match and updates the central rules table based on pre-programmed logic for the data flow definition counts that do not match and sends at least one updated rule to the SDN switch according to the pre-programmed logic. The SDN switch then updates the rule settings at the SDN switch based on the updated rule.

For convenience of the present disclosure, only a select number of network devices (first and second), communication ports, SDN switches (first through fifth, and last), traditional switches (first and second), and connections have been identified. The disclosure anticipates that there may be any number each of these in a particular application. The disclosure is not intended to limit the invention to the quantity of devices, communication ports, connections, switches, etc. in the examples presented herein. Furthermore, the accompanying logic diagram is intended as a principled example and not a limitation, in particular, with regard to iterative processing, as will be apparent to one of ordinary skill in the art.

The essence of the SDN rule modification counter system may include adding an extension to SDN devices that meets the following requirements: (a) rule modification indicator statistics in the form of either a counter or a hash; (b) counter statistics may be provided by the device representing the modifications this device has made to its software rules definition since its last boot time; and (c) this counter may roll over without causing an overflow error.

Alternatively, a hash representing the current state of rule settings may be deterministically computed on both an SDN switch and SDN controller. Any modifications to the current state may be flagged or identified by a counter. The modifications counted may include an ADD rule, a MODIFY rule, and a DELETE rule. These statistics values may be queried by a connected SDN controller. Optionally, notifications of changes of these statistics may be provided.

The following are at least three example applications where rule edit statistics give increased visibility to the SDN control plane to provide more background for decision making:

Example A: Switch takes corrective action—Assume a parity error occurs with an SDN rule in hardware and then notifies firmware. The device firmware may take corrective action to set the rule back to its correct state. Even if an event will be logged on the device for this error the SDN control plane may be unaware of this event. With the addition of rule edit statistics the SDN controller may now have visibility that a DELETE and an ADD or a MODIFY was performed. This SDN controller may then verify the state of the device is the same as its expected state as a secondary integrity check.

Example B. Changes made by a second controller—There may be two SDN controllers communicating with the same SDN device, and this device may provide rule edit statistics. When one of these SDN controllers makes an edit the other may be more directly aware that there are changes being made to the SDN device via the rule edit statistics.

Example C. Idle and hard timeouts—It is possible for rules to be removed via timeouts, and there exist edge cases where the SDN controller may not be notified. However, this removal may be reflected in the devices' rule edit statistics.

Possible statistics variations and granularities

This section is intended to highlight how possible statistics variations and granularities may be implemented. One global modification indicator for all rule types may include the following:

Modification indicator per rule type—The SDN implementation disclosed herein may be provided by OpenFlow, which provides rule definition in the form of Flows, Groups, and Meters, each of which may have its own modification indicator.

| Flow ADD, MODIFY, and DELETEs | modification indicator |
|---|---|
| Group ADD, MODIFY, and DELETEs | modification indicator |
| Meter ADD, MODIFY, and DELETEs | modification indicator |

Variation including edit type—

| Flow ADD | modification indicator |
|---|---|
| Flow MODIFY | modification indicator |
| Flow DELETE | modification indicator |
| Group ADD | modification indicator |
| Group MODIFY | modification indicator |
| Group DELETE | modification indicator |
| Meter ADD | modification indicator |
| Meter MODIFY | modification indicator |
| Meter DELETE | modification indicator |

Modification indicators per flow table—OpenFlow allows organizing flows into tables. Having these modification indicators per table would be ideal for SDN devices capable of storing large rule sets. This scheme does not apply to Groups and Meters, so they are not included here.

| Flow ADD, MODIFY, and DELETEs TABLE 0 | modification indicator |
|---|---|
| Flow ADD, MODIFY, and DELETEs TABLE 1 | modification indicator |
| Flow ADD, MODIFY, and DELETEs TABLE 2 | modification indicator |
| Continued for all supported tables . . . | |

Variation including edit type—

| | | |
|---|---|---|
| TABLE 0 | Flow ADD | modification indicator |
| | Flow MODIFY | modification indicator |
| | Flow DELETE | modification indicator |
| TABLE 1 | Flow ADD | modification indicator |
| | Flow MODIFY | modification indicator |
| | Flow DELETE | modification indicator |
| TABLE 2 | Flow ADD | modification indicator |
| | Flow MODIFY | modification indicator |
| | Flow DELETE | modification indicator |
| Continued for all supported tables . . . | | |

Subscription of stats: An SDN device providing the ability to manage notifications that modification indicators have increased would provide the following:

a. Enabling active notifications.

b. In the case of counters, optionally setting a threshold on how much the counters need to increase before an active notification is sent. Example: notify if the increase is 10 or more since the last notification.

c. Disabling active notifications.

Active notifications may propagate from:

A. The SDN devices via a message.

B. The SDN controller polling the SDN device for values until a change is noticed, then the SDN controller produces a notification.

This message may also include the new statistics values.

According to a certain embodiment of the system, the SDN controller is comparing the operation counters at the SDN controller to the rule counters at each SDN switch. SDN switches provide the count of their rule counters via the SDN connection to the SDN controller. The SDN controller will have its own specific counters associated with each specific SDN switch representing its expectations of how many operations have been performed on each specific SDN switch. The intent is that the SDN switch likely will not have access to the SDN controller counters. The term "operation counter" is used herein as a counter that corresponds to the rule counter at the SDN switch. The operation counters specifically count the number of rule modifications for each SDN switch. A rule modification count is associated with each specific SDN switch.

Two aspects potentially may apply:

Aspect A. For the purpose of triggering the SDN controller to check if there is a problem, the SDN switch can notify the SDN controller. This may take the form of the SDN switch noticing its own counters changed (incremented) and actively sending information about it to the SDN controller. Further, the SDN controller may be able to configure whether this active notification happens or not, but that may be an implementation detail. The important thing is that there will be times when changes are unexpected. So, if these changes occur, they are of interest to the SDN controller. An example of an existing feature of SDN technology that operates similarly to this behavior is port status events. With these events, the SDN switch detects a port state change, usually caused by the cable being unplugged, then actively sends this information to the SDN controller so that the SDN controller can then act on this information. This action can be as simple as showing that link as disconnected in a user interface (UI) of the SDN controller.

Aspect B. The SDN controller uses the SDN switch counters to determine if the counts are different. If they are different, the SDN controller then investigates if the SDN switch is not configured as expected. If there is a discrepancy in the configuration there are two possible resolutions: (1) the SDN controller makes the changes automatically or (2) a form of notification is generated by the SDN controller for the user of the system to inform them there is an issue that needs to be "fixed." The second resolution is more applicable to OT where network changes can have drastic consequences so a user must approve the changes. However, both resolutions are valid responses to this information.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware, and/or software modules or components. As used herein, a module or component may include various hardware components, firmware code, and/or any type of computer instruction or computer executable code located within a memory device and/or transmitted as transitory or non-transitory electronic signals over a system bus or wired or wireless network.

Several aspects of the embodiments disclosed herein may be illustrated and/or implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations and combinations of the independent claims with their dependent claims.

The scope of the present disclosure should, therefore, be determined only by the following claims.

The invention claimed is:

1. A system of software-defined networking (SDN) devices comprising:
   at least one SDN controller with a central rules table;
   at least one SDN switch with rule settings and in communication with the SDN controller on a network;
   a rule counter at the SDN switch that counts a number of rule modifications at the SDN switch; and
   an operation counter at the SDN controller that corresponds to the rule counter to count a number of rule modifications instructed to the SDN switch,
   wherein the SDN controller receives from the SDN switch an indication of the number of rule modifications at the SDN switch counted on the rule counter and compares the number of rule modifications counted on the rule counter to the number of rule modifications counted on the operation counter to determine a rule modification mismatch, and
   wherein the SDN controller updates the rule settings based on a pre-programmed rule logic upon determination of the rule modification mismatch.

2. The system of claim 1, wherein the SDN controller further updates the central rules table based on the pre-programmed rule logic upon determination of the rule modification mismatch.

3. The system of claim 2, wherein updates to the rule settings at the SDN switch are made based on the updated central rules.

4. The system of claim 3, wherein the updates to the rule settings at the SDN switch are communicated to one or more additional SDN switches on the network.

5. The system of claim 1, wherein the SDN controller:
determines hashes representing the current state of rule settings at the SDN switch;
compares the hashes to corresponding hashes at the central rules table;
identifies hashes that do not match; and
updates the rule settings of the SDN switch based on pre-programmed logic for the hashes that do not match.

6. The system of claim 5, wherein the SDN controller updates the central rules table based on pre-programmed logic for the hashes that do not match.

7. The system of claim 1, wherein the system further comprises at least one controller counter at the SDN controller and at least one switch counter at the SDN switch that count modifications specified by the SDN controller, and wherein the SDN controller:
identifies counts from the controller counter and the switch counter that do not match; and
updates the central rules table and the rule settings based on the pre-programmed count logic upon identification of counts from the controller counter and the switch counter that do not match.

8. A software-defined network (SDN) controller, comprising:
a central rules table; and
an operation counter that counts a number of rule modifications of at least one SDN switch and that corresponds to a rule counter at the SDN switch,
wherein the SDN controller receives from the rule counter at the SDN switch an indication of a number of rule modifications at the SDN switch counted on the rule counter and compares the number of rule modifications at the rule counter to the number of rule modifications at the operation counter to determine a rule modification mismatch, and
wherein the SDN controller updates and communicates updates to the rule settings of the SDN switch based on a pre-programmed rule logic upon determination of the rule modification mismatch.

9. The SDN controller of claim 8, wherein the SDN control updates the central rules table based on the pre-programmed rule logic upon determination of the rule modification mismatch.

10. The SDN controller of claim 9, wherein the updates to the rule settings of the SDN switch are made based on the updated central rules.

11. The SDN controller of claim 10, wherein the updates to the rule settings of the SDN switch are communicated to one or more additional SDN switches on the network.

12. The SDN controller of claim 8, wherein the updates to the rule settings of the SDN switch are communicated to one or more additional SDN controllers on the network.

13. The SDN controller of claim 8, wherein the SDN controller:
receives hashes representing the current state of rule settings from the SDN switch;
compares the hashes to corresponding hashes at the central rules table;
identifies hashes that do not match; and
upon identification of hashes that do not match, communicates updates to the rule settings of the SDN switch based on the pre-programmed logic for the hashes that do not match.

14. A packet processing device for a software-defined network (SDN) comprising:
rule settings;
a network interface to receive, via the SDN, control commands from at least one SDN controller with a central rules table; and
a rule counter that counts a number of rule modifications at the packet processing device,
wherein the packet processing device communicates the number of rule modifications at the packet processing device to the SDN controller to compare the number of rule modifications at the packet processing device to a number of rule modifications at an operation counter of the SDN controller to determine a rule modification mismatch, and
wherein the packet processing device receives updates to the rule settings from the SDN controller upon determination of the rule modification mismatch based on a pre-programmed rule logic.

15. The device of claim 14, wherein the updates to the rule settings at the packet processing device are based on an updated central rules table of the at least one SDN controller.

16. The device of claim 14, wherein the updates to the rule settings are communicated to one or more additional packet processing devices on the SDN.

17. The device of claim 14, wherein the packet processing device:
determines hashes representing the current state of rule settings at the packet processing device;
communicates the hashes for comparison to corresponding hashes at a central rules table of the SDN controller; and
receives updates to the rule settings of the packet processing device based on the pre-programmed logic for the hashes that do not match.

18. The device of claim 14, further comprising at least one switch counter that counts modifications specified by the SDN controller,
wherein the packet processing device communicates the count of the switch counter to the SDN controller to identify counts from the controller counter and switch counter that do not match and to update a central rules table and the rule settings based on the pre-programmed count logic for the counts that do not match.

19. The device of claim 14, wherein the packet processing device is an SDN switch.

* * * * *